United States Patent [19]

Skinner

[11] Patent Number: 5,499,059
[45] Date of Patent: Mar. 12, 1996

[54] METHOD AND APPARATUS FOR EFFECTING DYNAMIC COLOR SHIFT IN A TELEVISION RECEIVER

[75] Inventor: Kenneth R. Skinner, Ossining, N.Y.

[73] Assignee: Philips Electronics North America Corporation, New York, N.Y.

[21] Appl. No.: 263,699

[22] Filed: Jun. 22, 1994

[51] Int. Cl.[6] ............................... H04N 9/73; H04N 9/64
[52] U.S. Cl. .......................... 348/645; 348/655; 348/656
[58] Field of Search .................................... 348/645, 649, 348/650, 655, 656, 241, 242; H04N 9/73, 9/64

[56] References Cited

U.S. PATENT DOCUMENTS

| | | | |
|---|---|---|---|
| 4,633,299 | 12/1986 | Tanaka et al. | 348/656 |
| 4,694,330 | 9/1987 | Tanaka et al. | 358/27 |
| 4,754,321 | 6/1988 | Srivastava | 358/28 |
| 5,134,465 | 7/1992 | Ohki et al. | 348/649 |
| 5,333,019 | 7/1994 | Okamoto | 348/656 |
| 5,345,275 | 9/1994 | Lendaro | 348/656 |

Primary Examiner—James J. Groody
Assistant Examiner—Nina N. West
Attorney, Agent, or Firm—Edward W. Goodman

[57] ABSTRACT

A method and circuit for correcting color errors in displaying a color video signal on the display of a color television receiver, the color television receiver having drive circuits for each of the colors red, green and blue, for forming respective color drive signals, in response to color signal components present in the color video signal, for the display, the method including setting up the color drive circuits of the color television receiver for conversion of the color signal components in the color video signal to the color drive signals to a ratio for producing a white color temperature higher than that specified in a television standard, detecting the presence and amount of color in the color video signal to be displayed on the display of the color television receiver, and reducing the color drive signals for at least two of the colors in dependence on the detected amount of color in the color video signal, whereby the resulting chromaticity of the displayed colors is the same as that when the color drive circuits are set up for the standard white color temperature, while displayed white regions are at the higher than standard color temperature.

7 Claims, 3 Drawing Sheets

METHOD AND APPARATUS FOR EFFECTING DYNAMIC COLOR SHIFT IN A TELEVISION RECEIVER

BACKGROUND OF THE INVENTION

1. Field of the Invention

The subject invention relates to the correction of color errors in the display of color pictures in a television receiver.

2. Description of the Related Art

The NTSC standard specifies that the "temperature" at which "white" is set up should be 6770° K (Illuminant C). Industry practice is to use 65000 K for studio monitors. However, when viewing a television display set up in this manner, white or near white areas appear to be "dull". In response to this, television receiver manufacturers now set the "white" of the CRT of the television receiver to a relatively high color temperature, i.e., 8000° K to 15,000° K, to achieve "brighter looking" whites. However, when the CRT is set to this value, significant color errors result in the other colors when displayed.

U.S. Pat. No. 4,633,299 to Tanaka discloses a color temperature control circuit using a saturation level detector to alleviate this problem. In particular, instead of elevating the color temperature of "white", the Tanaka patent sets the CRT in accordance with the standard, i.e. 6500° K. Then the circuit disclosed in the Tanaka patent detects a white condition by measuring the signal levels of the color signals, and, above a certain threshold, increases the level of the green and blue signals thus raising the color temperature in white regions.

While ordinarily, the Tanaka circuit performs adequately, Applicant has found that under certain conditions, Tanaka may lead to over-driving the green and blue signals resulting in a condition known as "blooming".

SUMMARY OF THE INVENTION

It is an object of the present invention to provide "brighter looking" whites in a television display while showing the colors in their proper chromaticity, and while avoiding "blooming".

This object is achieved in a method for correcting color errors in displaying a color video signal on the display of a color television receiver, said color television receiver having drive circuits for each of the colors red, green and blue, for forming respective color drive signals, in response to color signal components present in said color video signal, for the display, the method comprising the steps:

setting up the color drive circuits of the color television receiver for conversion of said color signal components in said color video signal to the color drive signals to a ratio for producing a white color temperature higher than that specified in a television standard;

detecting the presence and amount of color in the color video signal to be displayed on the display of the color television receiver; and reducing the color drive signals for at least two of the colors in dependence on the detected amount of color in the color video signal, whereby the resulting chromaticity of the displayed colors is the same as that when the color drive circuits are set up for the standard white color temperature, while displayed white regions are at said higher than standard color temperature.

BRIEF DESCRIPTION OF THE DRAWINGS

With the above and additional objects and advantages in mind as will hereinafter appear, the invention will be described with reference to the accompanying drawings, in which:

FIGS. 3A and 3B show the rectified signals $|E_r-E_y|$ and $|E_b-E_y|$ at the outputs of rectifier circuits 10 and 12 of FIG. 1, while

DESCRIPTION OF THE PREFERRED EMBODIMENTS

The method of the subject invention involves developing a control signal from the color difference signals that approximates the magnitude of the chrominance signal:

$$MC=(|B-Y|+|R-Y|) \times A$$

where |B-Y| is the magnitude of the blue color difference signal, |R-Y| is the magnitude of the red color difference signal, and A is a gain factor. For the colors of white and black, MC=0. For all other colors, MC>0, and the magnitude is dependent on the saturation level of the colors.

By properly choosing the gain factor A, a desired threshold point can be achieved at which color saturation levels below this point will provide less action on the blue and green CRT drive circuits, and finally no action at zero saturation (white). For saturation levels above the threshold point, there is full action on the blue and green CRT drive circuits in order to dynamically shift the colors to their desired locations.

The magnitude of the chrominance signal MC is then used to determine the modified blue and green drive signals:

$$\text{Final } E_{bd}'=E_{bd}-(1-b)E_{bdm}$$

$$\text{Final } E_{gd}'=E_{gd}-(1-g)E_{gdm}$$

where $E_{bd}$ is the blue CRT drive voltage, $E_{gd}$ is the green CRT drive voltage, $E_{bdm}$ is the modified blue drive voltage, and $E_{gdm}$ is the modified green drive voltage, these modified drive voltages being determined as follows:

$$E_{bdm}=MC, \text{ if } MC \leq E_{bd} \text{ else } E_{bdm}=E_{bd}$$

$$E_{gdm}=MC, \text{ if } MC \leq E_{gd} \text{ else } E_{gdm}=E_{gd}$$

The multiplying factors (1-b) and (1-g) must be determined for given CRT phosphor coordinates, CRT gamma and white set-up. Typical values for b and g are 0.804 and 0.943, respectively.

Figure 1:
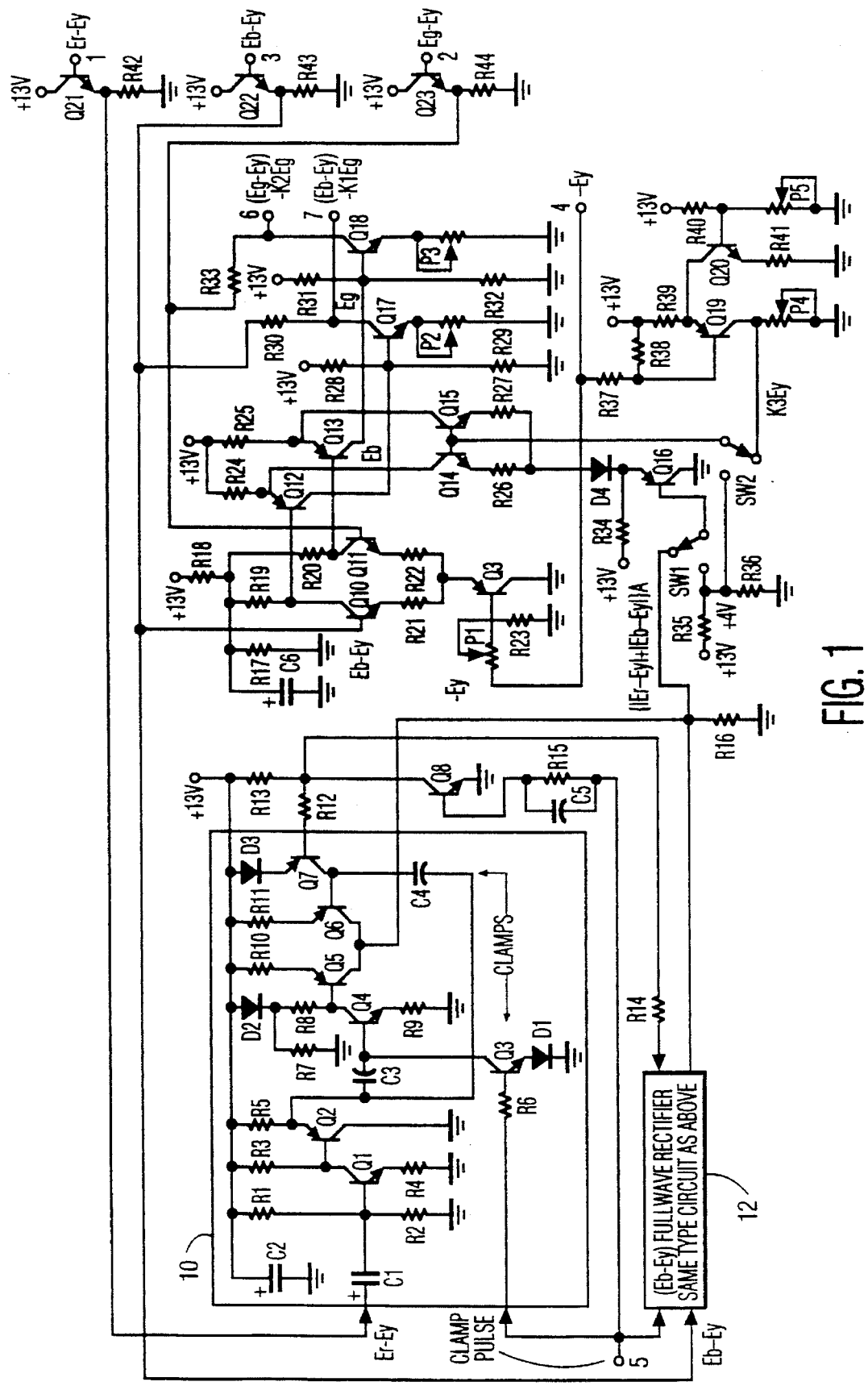
FIG. 1 is a schematic diagram of an embodiment of a circuit for performing the dynamic color shift of the subject invention.

FIG. 1 shows an embodiment of a circuit for performing the dynamic color shift of the subject invention.

Figure 2A:
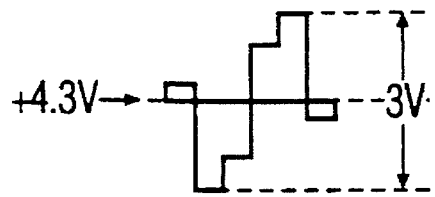
FIG. 2A shows the signal $E_r-E_y$.
Figure 2B:
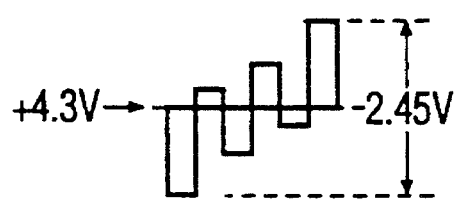
FIG. 2B shows the signal $E_b-E_y$.
Figure 2C:
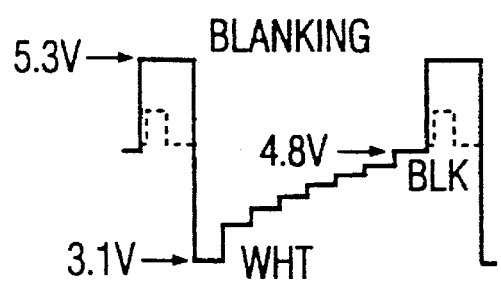
FIG. 2C shows the signal $-E_y$.
Figure 2D:
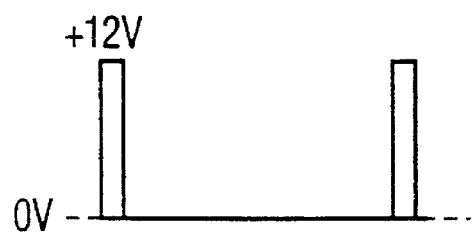
FIG. 2D shows the back-porch clamp signal, all of which are applied to the circuit of FIG. 1.
Figure 3A:
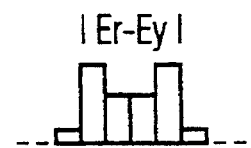
Figure 3B:
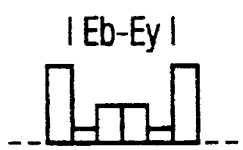
Figure 3C:
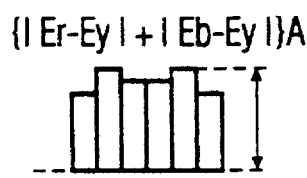
FIG. 3C shows the combined, scaled signal $(|E_r-E_y|+|E_b-E_y|)A$ at the resistor R16 in FIG. 1.

The color difference signals $E_r-E_y$, $E_g-E_y$, $E_b-E_y$, the luminance signal $-E_y$ (see FIG. 2C), and a back-porch clamp signal (see FIG. 2D) are applied to circuit inputs 1, 2, 3, 4 and 5, respectively. The $E_r-E_y$ and $E_b-E_y$ signals (see FIGS. 2A and 2B) are full-wave rectified by rectifier circuits 10 and 12, respectively. Since the rectifier circuits 10 and 12 are identical, FIG. 1 only shows rectifier circuit 10 in detail. In particular, transistors Q1 and Q2 amplify the $E_r-E_y$ signal, while the transistors Q3 and Q7 act as clamps to reference the back-porch region to either one diode drop (D1) above ground or one diode drop (D3) below the supply voltage. Only the positive swings of the signal turn on transistor Q4 while the negative swings turn on transistor Q6. Transistor Q4 inverts the positive going swing and give a negative going swing at its collector. Transistor Q5 is biased just at the point of turn-on by D2 and the resistor R7. The combined collector currents of transistors Q5 and Q6 produce a voltage across resistor R16 that is the full-wave rectification of the $E_r-E_y$ signal (see the waveform $|E_r-E_y|$ in FIG. 3A). In a similar manner, rectifier circuit 12 rectifies the $E_b-E_y$ signal, and its current (see the waveform $|E_b-E_y|$ in FIG. 3B) is summed with the $(|E_r-E_y|)$ signal current at resistor R16 forming the signal $(|E_r-E_y|+|E_b-E_y|)A$ (shown in FIG. 3C). The amplitude of this waveform is an approximation of the magnitude of the chrominance signal at any given time. When this amplitude is zero, or near zero, it is indicative of the monochrome (black-to-white) areas of an image, and when the amplitude increases, it is indicative of increasing color saturation in that area of the image. This signal is used as an indicator of the presence (or lack of) color in an image as well as the saturation of the color.

Figure 4A:
FIGS. 4A and 4B show the signals $E_b$ and $E_g$ driving the transistors Q17 and Q18 of FIG. 1.
Figure 4B:

The right half of FIG. 1 shows the circuitry for modifying the green and blue drives for the CRT. At the collectors of transistors Q17 and Q18, resistors R30 and R33 are inserted between circuit inputs 2 and 3 (the $E_b-E_y$ and the $E_g-E_y$ outputs of the color decoder) and circuit outputs 6 and 7 (coupled to the bases of the green and blue matrix stages in a television receiver). Any current drawn by Q17 and Q18 will decrease the voltage to the outputs 6 and 7 due to the drop across resistors R30 and R33. This has the effect of reducing the blue and green drives for the CRT. Whenever there is white in the image, the blue and green drives are not reduced so that whites remain at the desired high color temperature. For this condition, transistors Q17 and Q18 should be cut-off. For colors above a certain saturation, the transistors Q17 and Q18 should conduct an appropriate amount so as to effectively reduce the blue and green drives as if the CRT white were set at 6500° K. The bases of transistors Q17 and Q18 must therefore be driven by $E_b$ and $E_g$ signals, and the appropriate collector currents are adjusted by potentiometers P2 and P3 connecting the respective emitters to ground. The $E_b$ and $E_g$ signals are developed by matrixing the $E_b-E_y$ and the $E_g-E_y$ color difference signals with the $-E_y$ luminance signal in transistors Q9, Q10, Q11, and inverted by transistors Q12 and Q13. The waveforms and typical levels of the $E_b$ and the $E_g$ signals are shown in FIGS. 4A and 4B. Note, however, that the first bar (representing "white") is dotted and will be pulled down to the baseline when the dynamic color circuit is active. This pull-down is caused by transistors Q14 and Q15 when they conduct, and cause transistor Q12 and Q13 to go toward cut-off. Transistors Q14 and Q15, in turn, are controlled by two signals: a particular level of $E_y$ on the bases, and a particular level of the color magnitude signal feeding the emitter circuits from resistor R16 via transistor Q16. The particular level of $E_y$ on the bases of Q14 and Q15 is provided by the arrangement of transistors Q19 and Q20, wherein the base of transistor Q19 is provided with the signal $-E_y$, the emitter is connected to the 13V. source, and the collector is connected to ground via a potentiometer P4.

The collector of transistor Q20 is connected to the emitter of transistor Q19, while the base of the transistor Q20 is connected, on the one hand, to the 13V. supply and, on the other hand, to ground via a potentiometer P5. The circuit also includes two switches, SW1 and SW2, wherein switch SW1 is connected between resistor R16 and the base of transistor Q16 and alternatively connects the base of transistor Q16 to a voltage divider providing 4.0V., and SW2 alternatively connects the bases of transistors Q14 and Q15 to the voltage divider providing 4V., or to the collector of transistor Q19.

Figure 5:
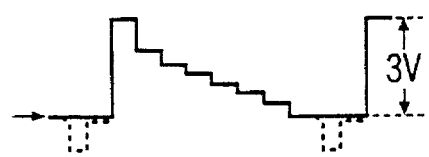
FIG. 5 shows the desired amplitude and DC levels for setting up the circuit.

In order to set up the circuit, a standard color bar signal (with white at 100%) is applied to the television receiver. Potentiometers P4 and P5 are adjusted to achieve the amplitude and DC levels shown in FIG. 5. With the switch SW1 connecting resistor R16 to the base of Q16, and switch SW2 connected to the collector of Q19, potentiometer P1, connecting the input signal $-E_y$ to the base of transistor Q9, is adjusted until the black level in the signal on the collector of transistor Q17 is at the cut-off point. With switch SW1 connecting the voltage 4.0V. to the base of transistor Q16, potentiometers P2 and P3, connecting the emitters of transistors Q17 and Q18, respectively, to ground, are adjusted to achieve 6500° K for the white bar.

The circuit of FIG. 1 includes the following components:

| | |
|---|---|
| C1 | 4.7 µF |
| C2, C6 | 100 µF |
| C3, C4 | 0.1 µF |
| C5 | 22 pF |
| P1 | 1 KΩ |
| P2, P4 | 5 KΩ |
| P3 | 20 KΩ |
| P5 | 10 KΩ |
| R1 | 18 KΩ |
| R2 | 3.9 KΩ |
| R3, R5, R37 | 2 KΩ |
| R4, R9 | 680 Ω |
| R6 | 27 KΩ |
| R7, R38 | 15 KΩ |
| R8, R39 | 750 Ω |
| R10, R11 | 330 Ω |
| R12, R14 | 47 KΩ |
| R13 | 10 KΩ |
| R15 | 100 KΩ |
| R16 | 240 Ω |
| R17, R34 | 11 KΩ |
| R18 | 300 Ω |
| R19, R20, R21, R22, R24, R25 R29, R30, R32, R33 | 510 Ω |
| R23 | 1.8 KΩ |
| R26, R27 | 270 Ω |
| R28, R31 | 12 KΩ |
| R35 | 6.8 KΩ |
| R36 | 3 KΩ |
| R40 | 8.2 KΩ |
| R41 | 470 Ω |
| R42, R43, R44 | 620 Ω |

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A method for correcting color errors in displaying a color video signal on the display of a color television receiver, said color television receiver having drive circuits for each of the colors red, green and blue, for forming respective color drive signals, in response to color signal components present in said color video signal, for the display, the method comprising the steps:

setting up the color drive circuits of the color television receiver for conversion of said color signal components in said color video signal to the color drive signals to a ratio for producing a white color temperature higher than that specified in a television standard;

detecting the presence and amount of color in the color video signal to be displayed on the display of the color television receiver; and reducing the color drive signals for at least two of the colors in dependence on the detected amount of color in the color video signal, whereby the resulting chromaticity of the displayed colors is the same as that when the color drive circuits are set up for the standard white color temperature, while displayed white regions are at said higher than standard color temperature.

2. A method as claimed in claim 1, wherein said color video signal includes a luminance signal component and a chrominance signal component, characterized in that said detecting step comprises:

deriving a control signal from said chrominance signal component in said color video signal, said control signal representing a magnitude of the chrominance signal component in said color video signal.

3. A method as claimed in claim 1, wherein said color video signal includes a luminance signal component and a chrominance signal component, said chrominance signal component being formed by color difference signals, characterized in that said detecting step comprises:

deriving a control signal from said color difference signals, said control signal representing a magnitude of the chrominance signal component in said color video signal.

4. A method as claimed in claim 1, characterized in that in said reducing step, the blue and green color drive signals are reduced.

5. A circuit for correcting color errors in displaying a color video signal on a display of a color television receiver, said color television receiver having drive circuits for each of the colors red, green and blue, for forming respective color drive signals, in response to color signal components present in said color video signal, for the display, said circuit comprising:

means for setting up the color drive circuits of the color television receiver for conversion of said color signal components in said color video signal to the color drive signals to a ratio for producing a white color temperature higher than that specified in a television standard;

means for detecting the presence and amount of color in the color video signal to be displayed on the display of the color television receiver; and means for reducing the color drive signals for at least two of the colors in dependence on the detected amount of color in the color video signal, whereby the resulting chromaticity of the displayed colors is the same as that when the color drive circuits are set up for the standard white color temperature, while displayed white regions are at said higher than standard color temperature.

6. A circuit as claimed in claim 5, wherein said color video signal includes a luminance signal component and a chrominance signal component, said chrominance signal component being formed by color difference signals, characterized in that said detecting means comprises:

means for deriving a control signal from said color difference signals, said control signal representing a magnitude of the chrominance signal component in said color video signal.

7. A circuit as claimed in claim 6, characterized in that said means for deriving a control signal comprises:

a first rectifier circuit for rectifying one of said color difference signals forming a first rectified signal;

a second rectifier circuit for rectifying another of said color difference signals forming a second rectified signal; and means for adding said first rectified signal and said second rectified signal, and for amplifying a resulting sum signal by a predetermined factor thereby forming said control signal.

* * * * *